(12) United States Patent
Popovic

(10) Patent No.: US 11,845,335 B2
(45) Date of Patent: Dec. 19, 2023

(54) IMAGE CAPTURE DEVICE AND ASSOCIATED SYSTEM FOR MONITORING A DRIVER

(71) Applicant: VALEO COMFORT AND DRIVING ASSISTANCE, Créteil (FR)

(72) Inventor: Aleksandar Popovic, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 248 days.

(21) Appl. No.: 17/414,607

(22) PCT Filed: Oct. 30, 2019

(86) PCT No.: PCT/EP2019/079617
§ 371 (c)(1),
(2) Date: Jun. 16, 2021

(87) PCT Pub. No.: WO2020/126179
PCT Pub. Date: Jun. 25, 2020

(65) Prior Publication Data
US 2022/0048386 A1 Feb. 17, 2022

(30) Foreign Application Priority Data
Dec. 19, 2018 (FR) ...................... 1873307

(51) Int. Cl.
B60K 28/06 (2006.01)
H04N 23/11 (2023.01)
(Continued)

(52) U.S. Cl.
CPC ............. B60K 28/06 (2013.01); H04N 23/11 (2023.01); H04N 23/55 (2023.01); H04N 23/71 (2023.01); H04N 23/74 (2023.01); H04N 23/75 (2023.01)

(58) Field of Classification Search
CPC ........ H04N 23/11; H04N 23/12; H04N 23/55; H04N 23/71; H04N 23/74; H04N 23/75; B60K 28/06
(Continued)

(56) References Cited

U.S. PATENT DOCUMENTS

| 2009/0268023 A1* | 10/2009 | Hsieh | H04N 23/74 |
|---|---|---|---|
| | | | 348/370 |
| 2013/0222603 A1* | 8/2013 | Agranov | H04N 25/135 |
| | | | 348/164 |

(Continued)

FOREIGN PATENT DOCUMENTS

| CN | 101803928 A | 8/2010 | |
|---|---|---|---|
| CN | 105306796 A * | 2/2016 | ........... H04N 5/2256 |

(Continued)

OTHER PUBLICATIONS

The First Office Action issued in Chinese Application No. 201980089501.2, dated Aug. 12, 2022 (25 pages).
(Continued)

Primary Examiner — Kathleen M Walsh
(74) Attorney, Agent, or Firm — Osha Bergman Watanabe & Burton LLP

(57) ABSTRACT

The invention relates to an image capture device (1) comprising an image sensor (9) making it possible to obtain both an infrared image (31) and an image in the visible range (35) by means of an array of optical filters comprising first filtering elements, having a transmission spectral band in the infrared range, as well as second filtering elements, having a transmission spectral band in the visible range. The image capture device further comprises: —a lighting device (11) configured to emit infrared radiation, and—a computer (13), programmed to control the power of the infrared radiation emitted by the lighting device, as a function of said ambient luminosity in the infrared range. The invention also relates
(Continued)

Figure 1:
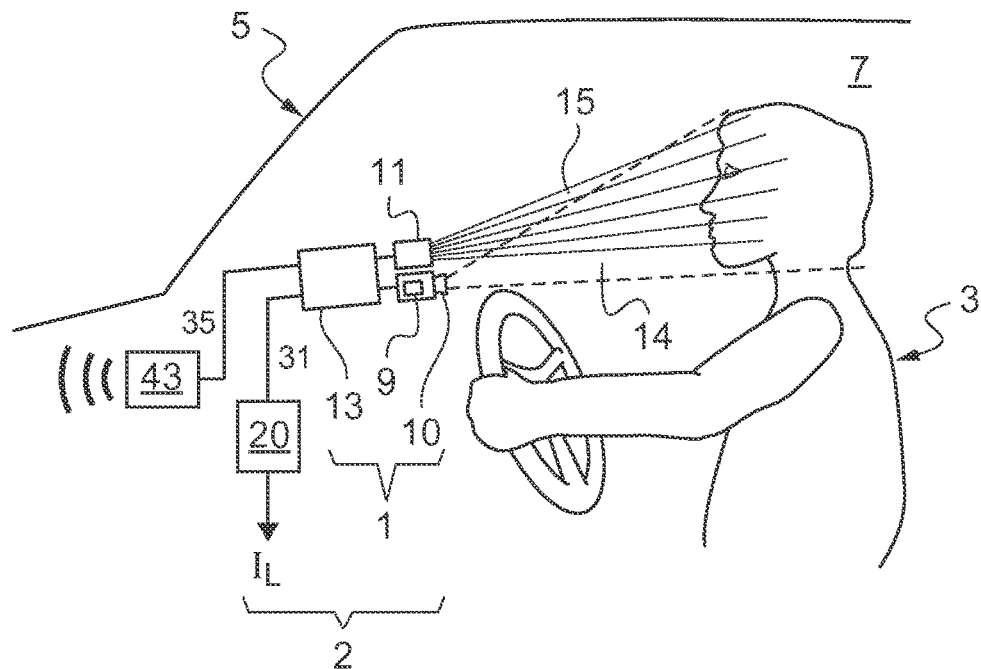

to a monitoring system (2) for monitoring a driver (3), comprising such an image capture device.

8 Claims, 3 Drawing Sheets

(51) Int. Cl.
*H04N 23/55* (2023.01)
*H04N 23/74* (2023.01)
*H04N 23/71* (2023.01)
*H04N 23/75* (2023.01)

(58) Field of Classification Search
USPC .......................................................... 348/77
See application file for complete search history.

(56) References Cited

U.S. PATENT DOCUMENTS

| 2018/0164156 | A1* | 6/2018 | Price | H04N 13/254 |
| 2018/0180980 | A1* | 6/2018 | Ouderkirk | G02B 5/04 |
| 2021/0044763 | A1* | 2/2021 | Sun | H04N 23/11 |
| 2021/0271878 | A1* | 9/2021 | Qian | G06V 20/10 |
| 2021/0314501 | A1* | 10/2021 | Chen | H04N 23/71 |
| 2021/0365702 | A1* | 11/2021 | Edwards | G06V 10/60 |

FOREIGN PATENT DOCUMENTS

| EP | 0342708 A2 * | 11/1989 | H04N 5/2256 |
| EP | 0342708 A2 | 11/1989 | |
| WO | WO-2015068404 A1 * | 5/2015 | G03B 15/05 |
| WO | WO-2018019206 A1 * | 2/2018 | G03B 17/14 |

OTHER PUBLICATIONS

International Search Report and Written Opinion corresponding to International Application No. PCT/EP2019/079617, dated Jan. 24, 2020 (11 pages).

* cited by examiner

IMAGE CAPTURE DEVICE AND ASSOCIATED SYSTEM FOR MONITORING A DRIVER

The present invention relates to an image-capturing device. It also relates to a monitoring system for monitoring a driver of a vehicle, including an image-capturing device.

Image-capturing devices that make it possible to visualize a given scene both in the visible region and in the infrared region, and to do so with one and the same image sensor, have been developed recently.

The image sensor of such a device, which is hybrid as it were, is sometimes called an "RGB-IR" (in line with the acronym for Red Green Blue—InfraRed) image sensor.

This image sensor comprises a matrix of photosensitive pixels and an array of elementary optical filters coinciding with these various photosensitive pixels.

Some of these elementary optical filters are color filters. They each transmit a portion of the visible radiation received by the image sensor, this portion corresponding in practice to a red, to a green or to a blue. These various elementary color filters make it possible to acquire a color image, for example an "RGB" image.

The other elementary optical filters of the image sensor are at least partially transparent in the infrared region. They make it possible to acquire an image of the scene in question in the infrared region.

The color image and the image in the infrared region, which contain additional information, are thus obtained with one and the same sensor, this being beneficial in particular in terms of cost price and size.

However, the ambient brightness in the environment of an image-capturing device is often markedly different in the visible region and in the infrared region. It is therefore generally not possible with such an image sensor to obtain optimum exposure both for the color image and for the image in the infrared region.

In this context, the present invention proposes an image-capturing device comprising an image sensor, which includes:
- an array of optical filters receiving electromagnetic radiation and comprising first filter elements each able to transmit a first portion of the electromagnetic radiation contained in a given infrared wavelength range, and second filter elements each able to transmit at least one component of a second portion of the electromagnetic radiation located in the visible, and
- a matrix of photosensitive pixels comprising first photosensitive pixels arranged so as to capture the first portion of the electromagnetic radiation transmitted by the first filter elements, and second photosensitive pixels arranged so as to capture the component transmitted by the second filter elements, each of the first and second photosensitive pixels being able to generate an electrical signal representative of the power of the electromagnetic radiation that it captures.

According to the invention, the image-capturing device furthermore comprises:
- a lighting device configured so as to emit infrared radiation in a field of view of the image-capturing device, said infrared radiation being located at least partially in said range of wavelengths transmitted by the first filter elements, and
- a computer, programmed to execute the following steps:
  a) determine an ambient brightness in the infrared region,
  b) control the power of the infrared radiation emitted by the lighting device on the basis of said ambient brightness in the infrared region,
  c) acquire the electrical signals generated by the first and second photosensitive pixels, and form a first image from the electrical signals generated by the first photosensitive pixels, and form a second image from the electrical signals generated by the second photosensitive pixels.

The infrared radiation, which illuminates the scene located in the field of view of the image-capturing device, comprises the radiation emitted by the lighting device and the infrared radiation possibly coming from other surrounding sources (sunlight for example).

The lighting device, which is controlled on the basis of the ambient brightness in the infrared region, makes it possible to control the total power of the infrared radiation that illuminates the scene.

This allows optimum exposure for the first image ("infrared" image), even if the exposure time (that is to say the integration time) or possibly other exposure parameters (gain, aperture), are also imposed, for example in order to obtain optimum exposure for the second image (image in the visible region).

The computer may also be programmed to execute the following steps:
  a') determine an ambient brightness in the visible region, and
  b') control at least one of the following exposure parameters on the basis of said ambient brightness in the visible region:
    an integration time, each of said electrical signals being representative of an electric charge or voltage, accumulated by the corresponding photosensitive pixel over said integration time,
    a gain applied to said electrical signals,
    an aperture of a diaphragm of an optical system of the image-capturing device.

Controlling one or more of these exposure parameters in this way makes it possible to obtain a suitable exposure for the second image, and thus to prevent it from being overexposed or underexposed. As explained above, controlling the power of the infrared radiation emitted by the lighting device also makes it possible to obtain a suitable exposure for the first image ("infrared" image), and to do so even if the abovementioned exposure parameters are set elsewhere, on the basis of the ambient brightness in the visible region.

In one conceivable embodiment, provision may be made for the computer to be programmed, with step c) having been executed beforehand, to determine said ambient brightness in the visible region, in step a'), on the basis of brightness values of at least some of the image pixels of the second image that was produced in said previous execution of step c).

In one conceivable embodiment, the computer is programmed, in step a'), to determine said ambient brightness in the visible region such that it is representative of a second average brightness level in the second image produced in said previous execution of step c).

In one conceivable embodiment, the computer is programmed, in step b'), to correct at least one of said exposure parameters on the basis of a difference between a second average brightness target value, on the one hand, and the second average brightness level in the second image produced in the previous execution of step c), on the other hand.

In one conceivable embodiment, the computer is programmed, with step c) having been executed beforehand, to determine said ambient brightness in the infrared region, in step a), on the basis of brightness values of at least some of the image pixels of the first image that was produced in said previous execution of step c).

In one conceivable embodiment, the computer is programmed, in step a), to determine said ambient brightness in the infrared region such that it is representative of a first average brightness level in the first image produced in said previous execution of step c).

In one conceivable embodiment, the computer is programmed, in step b), to control the power of the infrared radiation emitted by the lighting device on the basis of a difference between a first average brightness target value, on the one hand, and the first average brightness level in the first image produced in the previous execution of step c), on the other hand.

In one conceivable embodiment, said wavelength range transmitted by the first filter elements is between 700 nanometers and 1100 nanometers.

In one conceivable embodiment, the second filter elements comprise red filter elements having a red bandwidth transmitting wavelengths at least between 550 nanometers and 700 nanometers, green filter elements having a green bandwidth transmitting wavelengths at least between 450 nanometers and 650 nanometers and blue filter elements having a blue bandwidth transmitting wavelengths for example between 400 nanometers and 550 nanometers.

Of course, the various features, variants and embodiments of the present invention may be combined with one another in various combinations, as long as they are not mutually incompatible or mutually exclusive.

The invention also proposes a monitoring system for monitoring a driver of a vehicle, comprising an image-capturing device as described above and a processing unit programmed to determine a level of the driver's inability to drive based at least on said first image.

The level of inability to drive may comprise a drowsiness level and/or a distraction level of the driver.

Figure 2:
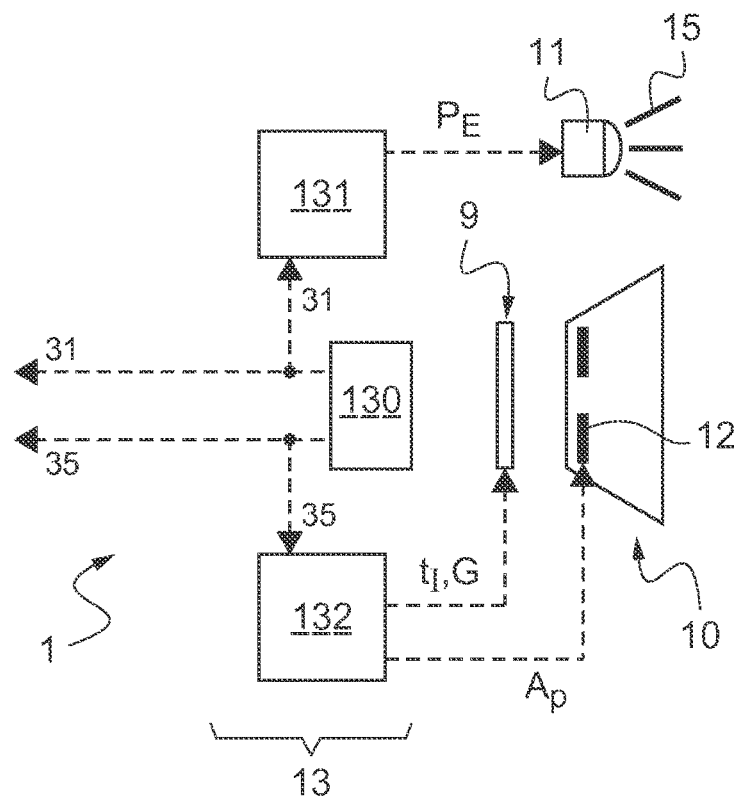
Figure 3:
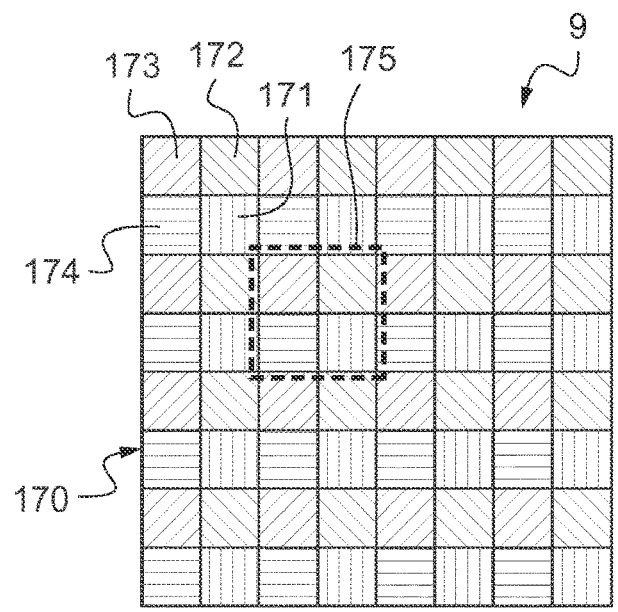
Figure 4:
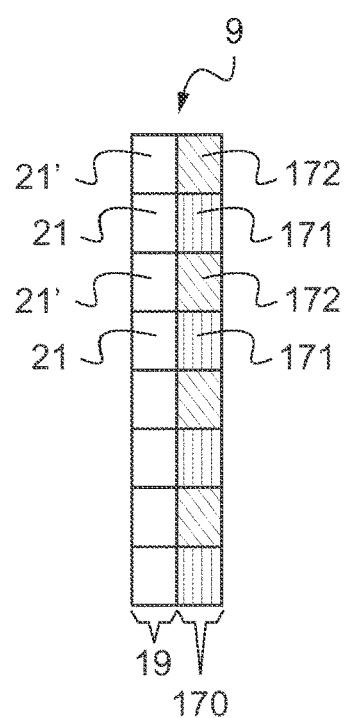
Figure 5:
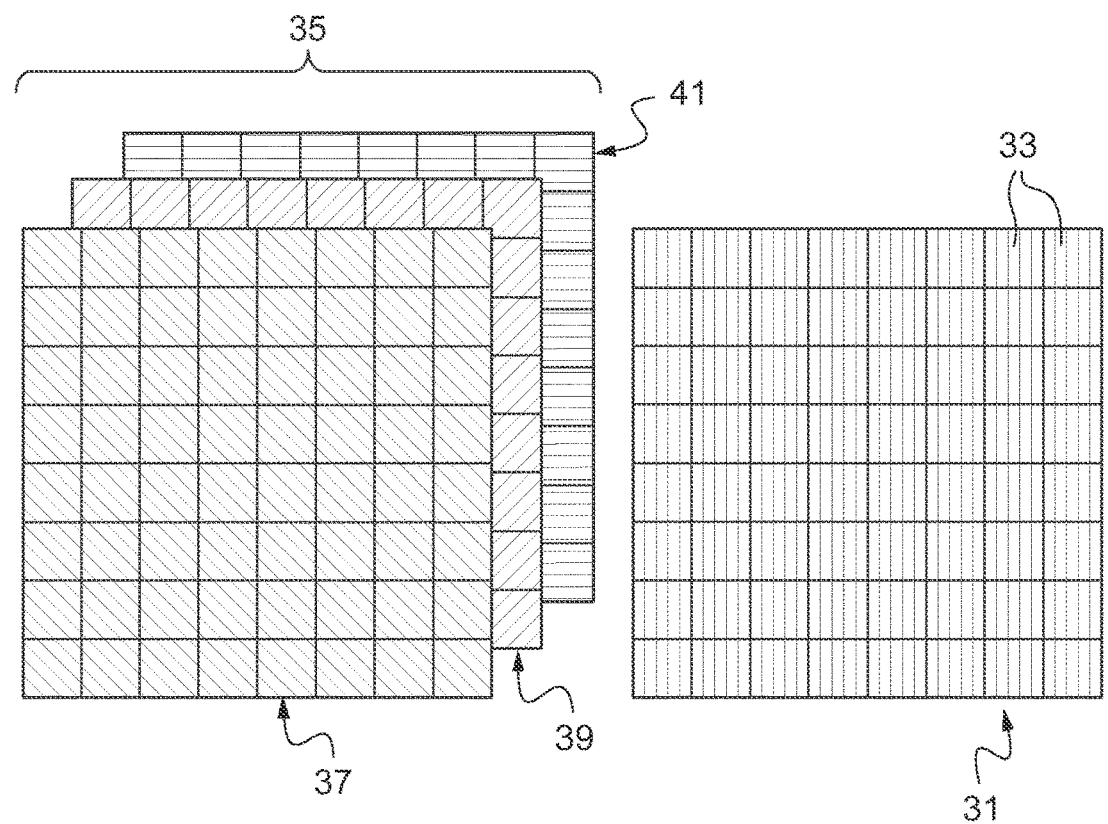
Figure 6:
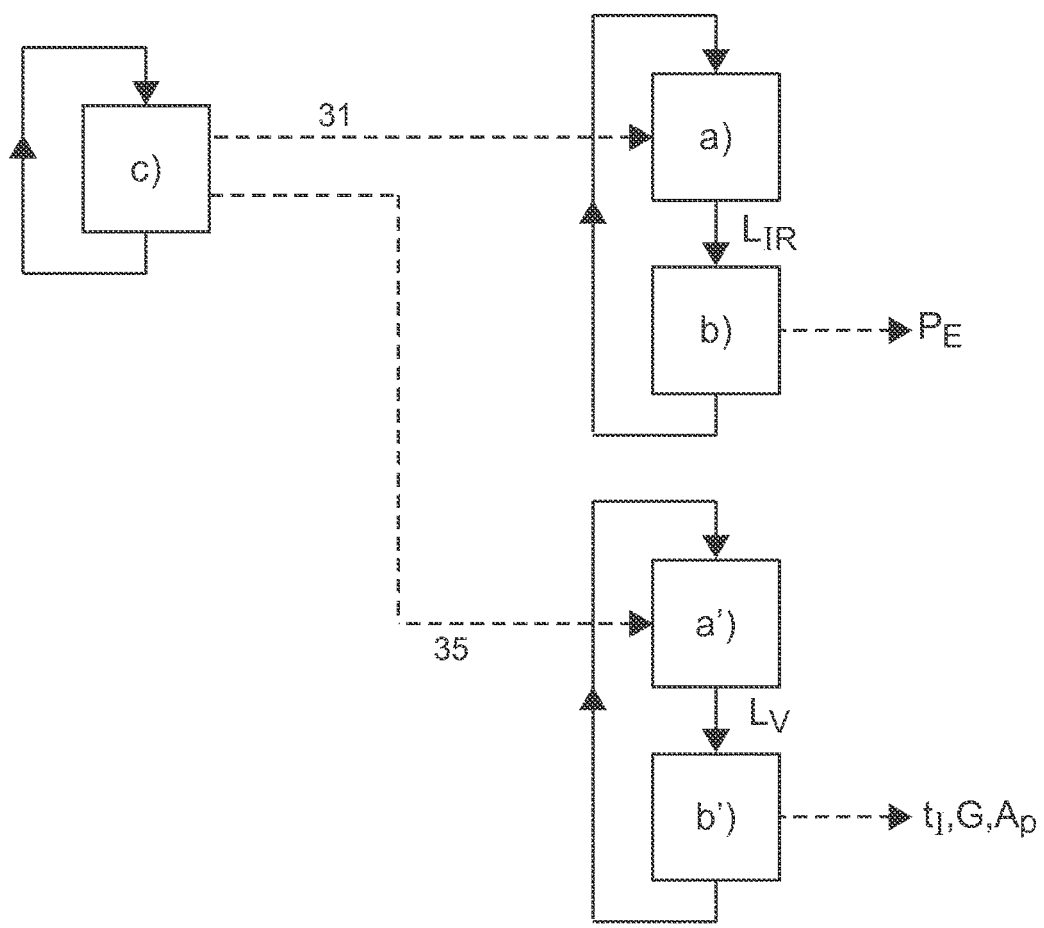

In addition, various other features of the invention will become apparent from the appended description given with reference to the drawings, which illustrate non-limiting embodiments of the invention and in which:

FIG. 1 schematically shows a motor vehicle comprising an image-capturing device implementing the teachings of the invention, seen from the side, FIG. 2 shows, in more detail, some elements of the image-capturing device from FIG. 1, FIG. 3 schematically shows an array of optical filters with which an image sensor of the image-capturing device from FIG. 1 is provided, seen from the front, FIG. 4 schematically shows this same image sensor, seen from the side, FIG. 5 schematically shows an infrared image and a color image delivered by the image-capturing device from FIG. 1, and FIG. 6 schematically shows steps executed by a computer of the image-capturing device from FIG. 1.

FIG. 1 shows a vehicle 5, here a motor vehicle, equipped with a monitoring system 2 for monitoring a driver 3 of the vehicle. This monitoring system 2 comprises an image-capturing device 1 and a processing unit 20 that is programmed to determine a level of the driver's 3 inability to drive, $I_L$, based on one or more images delivered by the image-capturing device 1.

The image-capturing device 1 comprises an image sensor 9 (FIG. 2) and an optical system 10 such as a lens. The optical system 10 forms, on the image sensor 9, an image of the content of the field of view 14 of the image-capturing device 1.

As shown in FIG. 1, the image-capturing device 1 is located in a passenger compartment 7 of the vehicle, in a region close to a windshield of the vehicle. It is for example integrated into an instrument panel, into a dashboard or into a control console of the vehicle.

The image-capturing device 1 is oriented such that its field of view 14 covers the area usually occupied by the head of the driver 3 when said driver is seated in the driver's seat. The image-capturing device 1 is thus able to capture images of the face of the driver 3.

What is noteworthy is that the image sensor 9 is a hybrid sensor, as it were, making it possible to visualize the content of the field of view 14 both in the infrared region and in the visible region. In this case, the image sensor 9 is equipped with a specific array 170 of optical filters (FIG. 3) that makes it possible, with one and the same matrix 19 of photosensitive pixels, to acquire both:
  a first image 31, hereinafter called "infrared image", produced from a first portion of the electromagnetic radiation collected by the optical system 10, this first portion being located in the infrared region, and
  a second image 35, produced from a second portion of the electromagnetic radiation collected by the optical system 10, this second portion being located in the visible region.

In the example described here, this second image 35 is a color image (it is also called "color image" hereinafter).

By virtue of this specific image sensor 9, the image-capturing device 1 is able to capture the infrared image in question, as well as this color image, while still remaining highly compact. The infrared image 31 may for example be used to monitor the driver 3 and determine his level of inability to drive $I_L$. The color image is more pleasing to the human eye and contains more information than an infrared image (usually displayed in grayscale). The color image may therefore be acquired for multiple purposes; for example, it may be used to communicate with a remote electronic device, for example within the context of a teleconference, or else be kept in memory for security reasons, or as a "souvenir photo" for commemorating a journey.

The image-capturing device 1 also comprises a computer 13, comprising at least a processor and an electronic memory, programmed to control one or more exposure parameters, such as the integration time and the gain that are used to obtain the images 31, 35 in question. The computer 13 is programmed to control this or these exposure parameters on the basis of an ambient brightness in the visible region. This makes it possible to obtain a suitable exposure for the second image 35.

The image-capturing device 1 also comprises a lighting device 11 for illuminating the field of view 14 in the infrared region. This lighting device 11 is controlled by the computer 13 on the basis of an ambient brightness in the infrared region. Controlling the power of the infrared radiation emitted by the lighting device 11 in this way also makes it possible to obtain a suitable exposure for the infrared image, even if the abovementioned one or more exposure parameters are adjusted on the basis of the ambient brightness in the visible region, and not in the infrared region.

The lighting device 11 controlled by the computer 13 therefore makes it possible, as it were, to avoid an excessively large difference between the ambient brightness in the visible region and that in the infrared region, thereby making it possible, for one and the same integration time $t_I$ or for one and the same gain G, to obtain an appropriate exposure both for the infrared image 31 and for the color image 35.

The various elements and functionalities of this image-capturing device 1 may now be described in more detail. The image sensor 9 will be described first. The way in which the exposure parameters (integration time $t_I$, gain G, aperture Ap) are controlled will be presented second. The lighting device 11 and its control will then be presented, before describing the way in which the parameter of the driver's 3 inability to drive is determined.

RGB-IR Image Sensor

As may be seen in FIGS. 3 and 4, the array of optical filters 170 of the image sensor 9 is arranged facing the matrix 19 of photosensitive pixels of this sensor, so as to filter the electromagnetic radiation coming from the field of view 14 of the image-capturing device 1 (radiation that was collected by the optical system 10), before this radiation reaches the photosensitive pixels 21, 21' in question.

The array of optical filters 170 comprises multiple filter elements 171, 172, 173, 174, that is to say multiple elementary optical filters, each arranged facing one of the photosensitive pixels 21, 21'. Each photosensitive pixel thus captures a portion of the electromagnetic radiation that has been filtered by the filter element with which it is associated. As explained below, these individual filter elements 171, 172, 173, 174 are of various types, for example blue, green, red and infrared, thereby making it possible to acquire the abovementioned color image and infrared image.

In this case, the array of optical filters 170 comprises:
 first filter elements 171, each able to transmit a first portion of the electromagnetic radiation located in a given infrared wavelength range, and
 second filter elements 172, 173, 174, each able to transmit at least one component of a second portion of the electromagnetic radiation located in the visible, between 400 nanometers and 700 nanometers.

In the embodiment described here, the first filter elements 171 transmit only wavelengths located in said infrared wavelength range. This wavelength range mainly extends beyond 700 nanometers. It may for example extend from 700 nanometers to 1100 nanometers.

In the example described here, the second filter elements 172, 173, 174 transmit only the wavelengths located between 400 and 700 nanometers. As a variant, however, they could transmit both wavelengths located in the visible and wavelengths located in the infrared.

The second filter elements 172, 173, 174 in this case comprise red filter elements 172, green filter elements 173 and blue filter elements 174. The terms "red", "green" and "blue" are used with their common meaning. The values of the red, green and blue bandwidths set out below are given by way of non-limiting example.

The red filter elements 172 have a red bandwidth transmitting the component of the second portion of the electromagnetic radiation having wavelengths for example mainly between 550 nm and 700 nm.

The green filter elements 173 have a green bandwidth transmitting the component of the second portion of the electromagnetic radiation having wavelengths for example mainly between 450 nm and 650 nm.

The blue filter elements 174, for their part, have a blue bandwidth transmitting the component of the second portion of the electromagnetic radiation having wavelengths for example mainly between 400 nm and 550 nm.

The various filter elements 171, 172, 173, 174 of the array of optical filters are arranged with respect to one another so as to form a pattern 175 that is repeated regularly so as to form the array of optical filters 170. This pattern 175 here comprises four filter elements, in this case: one of the first filter elements 171, one of the red filter elements 172, one of the green filter elements 173, and one of the blue filter elements 174. These four adjacent filter elements form a square. As shown in the figures, the array of optical filters 170 is therefore comparable to what is called a "Bayer" array, in which one of the green filter elements would have been replaced with an element that is transparent in the infrared. As a variant, the pattern of filter elements, which is repeated several times so as to form the array of optical filters, could be formed differently (for example comprising more green filter elements than red or blue filter elements).

With regard now to the matrix 19 of photosensitive pixels, this comprises:
 first photosensitive pixels 21, arranged so as to capture the first portion of the electromagnetic radiation transmitted by the first filter elements 171, and
 second photosensitive pixels 21', arranged so as to capture the various red, green and blue components transmitted by the second filter elements 172, 173, 174.

Each of the first and second photosensitive pixels 21, 21' produces, through the photoelectric effect, an electrical signal representative of the power of the electromagnetic radiation that it has captured (each photosensitive element, in a certain way, behaves like a photodiode). This electrical signal is produced in the form of an electric charge or voltage present between two terminals of the electrical capacitance formed by the photosensitive element. This electrical signal is produced by the photosensitive pixel 21, 21' under consideration at the end of a given integration time $t_I$.

More precisely, before acquiring the first and second images 31, 35, the electric charges, or the voltages between the terminals of the first and second photosensitive pixels 21, 21', are reinitialized (reset to zero), and then each of these photosensitive pixels 21, 21' accumulates electric charges that are produced through the photoelectric effect during said integration time $t_I$. The electrical signal produced by the photosensitive pixel 21, 21' under consideration corresponds to the charge, or to the voltage between the terminals of this photosensitive pixel 21, 21', at the end of this integration time $t_I$, sometimes called exposure time, acquisition time, or else integration time. The electrical signal produced by each of the first and second photosensitive pixels 21, 21' is representative of the number of photons received by the photosensitive pixel under consideration during the integration time $t_I$ (for example proportional to this number of photons).

In the embodiment described here, the semiconductor substrate of the matrix 19 of photosensitive pixels 21, 21' is made of (suitably doped) silicon. The sensitivity of the photosensitive pixels in the infrared region is thus limited to the near-infrared region: the sensitivity range of the first photosensitive pixels 21, equipped with the first filter elements 171, is in this case between 700 nanometers and 1100 nanometers.

The image sensor 9 is for example a CMOS (in line with the acronym for "Complementary Metal-Oxide Semiconductor") or CCD (in line with the acronym "Charge-Coupled Device") image sensor.

A gain G is applied to the various electronic signals generated by the first and second photosensitive pixels 21, 21'. Each of these signals is multiplied by this gain G in order to obtain a corresponding amplified electrical signal, which is for example then digitized by way of an analog-to-digital converter. In the case of a CCD sensor, provision may for example be made for one and the same amplifier to apply the abovementioned gain G to the various electrical signals, generated beforehand by the photosensitive pixels 21, 21' and then transferred, row-by-row and column-by-column (for example), to this amplifier. In the case of a CMOS sensor, each photosensitive pixel 21, 21' may be equipped with its own amplifier, these various amplifiers each applying the same gain G to the corresponding electrical signal. As a variant, these various amplifiers could apply different gains, friends whose average value is equal to the abovementioned gain G.

Acquisition of an image by the image sensor 9 comprises:
exposing the first and second photosensitive pixels 21, 21', during the integration time $t_I$, in order to generate said electrical signals, and
subsequently amplifying these electrical signals with the gain G.

During this image acquisition, the values of the integration time $t_I$ and of the gain G are set by the computer 13, which controls the image sensor 9.

The amplified electrical signals produced during this image acquisition are processed by the computer 13, in a step c) (FIG. 6), in order to produce the infrared image 31 and the color image 35.

Composition of the Infrared Image and of the Color Image

The infrared image 31 is formed of a matrix of image pixels 33 (FIG. 5) associated with the various photosensitive pixels 21, 21' of the image sensor 9. In the embodiment described here, the computer 13 is programmed to implement an interpolation algorithm that makes it possible to form a "complete" infrared image 31, even though only one photosensitive pixel 21 out of four captures infrared radiation, in the image sensor. In other words, the infrared image 31 here comprises as many image pixels 33 as the image sensor 9 comprises photosensitive pixels, including first 21 and second 21' photosensitive pixels.

Each image pixel 33 of the infrared image 31 has an associated brightness value representative of the value of one or more of the amplified electrical signals coming from the first photosensitive pixels 21. In this case, this brightness value is determined on the basis of the values of the amplified electrical signals coming from the first photosensitive pixels 21 that are closest to the position corresponding, on the image sensor 9, to the image pixel 33 under consideration.

The computer 13 is also programmed to form the color image 35, shown schematically in FIG. 5, from the amplified electrical signals coming from the second photosensitive pixels 21'.

The color image 35 is itself also formed of a matrix of image pixels (not shown) associated with the various photosensitive, pixels 21, 21' of the image sensor 9. In the same way as for the infrared image, the computer 13 is programmed here to implement an interpolation algorithm that makes it possible to form a "complete" color image 35, even though only one photosensitive pixel 21 out of four captures radiation located in the abovementioned red or green or blue bandwidth. In other words, the color image here comprises as many image pixels as the image sensor 9 comprises photosensitive pixels, including first 21 and second 21' photosensitive pixels.

Each image pixel of the color image 35 is associated with a brightness value, representative of values of some of the amplified electrical signals coming from second photosensitive pixels 21'. This brightness value is representative of the intensity of the visible electromagnetic radiation received by the second photosensitive pixels 21' that, on the image sensor 9, are located in the immediate vicinity of the position that, on this sensor, is associated with the image pixel under consideration.

In this case, the computer 13 is programmed here to first of all form three monochrome channels based on the amplified electrical signals coming from the second photosensitive pixels 21'. The computer 13 thus forms a red channel 37 from the amplified electrical signals coming from the second photosensitive pixels located facing the red filter elements 172. It also forms a green channel 39 from the amplified electrical signals coming from the second photosensitive pixels located facing the green filter elements 173. Finally, it forms a blue channel 41 from the amplified electrical signals coming from the second photosensitive pixels associated with the blue filter elements 174.

Each of these channels, red 37, green 39 and blue 41, is a grayscale image (each image pixel of the channel under consideration has a brightness value, but no hue or chrominance value) associated with the color of the channel under consideration and of the same size as the color image 35 (that is to say comprising the same number of image pixels).

To develop the color image 35, the computer 13 then implements an algorithm that makes it possible to combine the brightness values of the red channel 37, of the green channel 39 and of the blue channel 41, for each image pixel, in order to obtain, for the "color" image pixel under consideration:
an overall brightness value for the visible region (for example equal to the average of the brightnesses of the various channels), and
two chrominance values that are complementary and representative of the chromatic properties of the light captured at the point under consideration of the image sensor 9.

As shown in FIG. 6, the computer 13 is programmed here to execute step c) several times in succession, during which it acquires the amplified electrical signals delivered by the image sensor 9 and then forms the infrared image 31 and color image 35. This step is executed here by a preprocessing module 130 of the computer 13 (FIG. 2).

Controlling the Exposure Parameters

The exposure parameters of the image-capturing device 1, specifically the integration time $t_I$, the gain G, and optionally the aperture Ap of a diaphragm 12 of the optical system 10, are controlled here by an exposure control module 132 of the computer 13 (FIG. 2) in steps a') and b') (FIG. 6) that are described below.

The exposure control module 132 is programmed to determine the ambient brightness in the visible region, which was mentioned above, in step a').

The ambient brightness in the visible region is representative of the power of visible electromagnetic radiation (the components of which are mainly between 400 nanometers and 700 nanometers), coming from an environment of the image-capturing device 1, here coming from the field of view 14 of this device, and received by a brightness sensor. In the embodiment described here, this brightness sensor is formed by way of the image sensor 9 that was described above.

As a variant, it could however be a sensor separate from the image sensor, such as a photodiode arranged so as to receive radiation coming from the field of view of the image-capturing device.

In this case, the ambient brightness in the visible region is determined from a color image 35, delivered by the preprocessing module 130 at the end of a previous execution of step c), and therefore corresponding to an image acquisition performed beforehand by the image sensor 9.

In this case, the exposure control module 132 is programmed to determine the ambient brightness in the visible region on the basis of the brightness values of at least some of the image pixels of this color image 35 acquired beforehand by the image-capturing device 1.

The ambient brightness in the visible region may, such as here, be determined by calculating an average of the brightness values of the image pixels of this color image 35. The ambient brightness in the visible region is then representative of an average brightness level in this color image 35, hereinafter called second brightness level and denoted $L_V$.

The average in question may relate to all of the image pixels of the color image 35, or relate to only some of these image pixels, located in an area of interest of the image, corresponding for example to the image of the face of the driver 3. Provision may also be made for this average to take into account only the brightness values of the image pixels that meet a given criterion, for example that are contained within a given interval of values. The second brightness level $L_V$ may thus, by way of example, be representative of the average brightness of the low-brightness areas of the color image 35, or of the intermediate-brightness areas of this image.

As a variant, the ambient brightness in the visible region could be determined on the basis of the brightness values of the various chromatic channels of the color image under consideration (red, green and blue channel), possibly assigned different weighting coefficients, rather than being determined on the basis of brightness values of the image pixels of the overall color image resulting from the fusion of these three chromatic channels.

In step b'), the exposure control module 132 controls the abovementioned exposure parameters on the basis of the ambient brightness in the visible region as determined in previous step a').

To this end, the exposure control module 132 in this case corrects the values of the exposure parameters, which are then applied to the image sensor 9 and to the diaphragm 12, on the basis of a difference ε2 between:
- an average brightness target value, hereinafter called second target value $L_{V,O}$, on the one hand, and
- the second brightness level $L_V$ (average brightness in the color image 35 acquired beforehand), on the other hand.

This correction is made so as to gradually bring the second brightness level $L_V$ to the second target value $L_{V,O}$ during repetitions of steps a'), b') and c). This correction may consist for example in adding a corrective term to a previous value of the exposure parameter under consideration, this corrective term being proportional to the abovementioned difference ε2 (proportional correction). More generally, this correction consists in slaving the second brightness level $L_V$ to the second target value $L_{V,O}$. This slaving may in particular be of proportional, proportional-integral, or proportional, integral and derivative type (that is to say of "PID" type).

The second target value $L_{V,O}$ corresponds for example to the average brightness in an image considered to be suitably exposed.

An image is considered to be suitably exposed when, for example:
- the average brightness in this image is contained within a given interval, this interval extending for example from one quarter to three quarters of the maximum brightness value able to be associated with an image pixel, and/or when the proportion of image pixels of the image whose brightness value is equal to said maximum brightness value (high-saturation image pixels) is less than a given threshold, this threshold being for example equal to one quarter, and/or when the proportion of image pixels of the image whose brightness value is equal to a minimum brightness value (low-saturation image pixels) is less than a given threshold, this threshold being for example equal to one quarter.

The second target value $L_{V,O}$ may for example be between one quarter and three quarters of the abovementioned maximum brightness value, or between one third and two thirds of this maximum value. By way of example, if the brightness values in question are coded on eight bits, and are between 0 and 255, the maximum brightness value in question (high saturation) is equal to 255, and the second target value $L_{V,O}$ may then be between 63 and 191, for example, or between 85 and 170.

In the example described here, the exposure control module 132 controls each of the integration time $t_I$, the gain G and the aperture Ap of the diaphragm of the optical system 10 (aperture diaphragm). As a variant, the aperture Ap could however be fixed (or possibly be manually adjustable). Likewise, the exposure control module 132 could be programmed, with the integration time $t_I$ being fixed, to control only the value of the gain G on the basis of the second brightness level $L_V$ in the color image 35 (or, conversely, to control only the integration time $t_I$). Controlling the gain G in this way is sometimes called "automatic gain control" or "AGC" in the specialist literature.

Lighting Device

The lighting device 11 is able to emit infrared radiation located at least partially in the range of wavelengths transmitted by the first filter elements 171 of the array of optical filters of the image sensor 9 (which range, as will be recalled, extends here from 700 nanometers to 1100 nanometers). The lighting device 11 may for example be formed by way of light-emitting diodes.

The infrared radiation emitted by the lighting device 11 is emitted in the form of a light beam 15, directed so as to illuminate at least a portion of the field of view 14 of the image-capturing device 1 (FIG. 1). In this case, this light beam is directed toward the area usually occupied by the face of the driver 3 when he is seated on the driver's seat.

The power of the infrared radiation emitted by the lighting device 11 is controlled by a lighting control module 131 of the computer 13 (FIG. 2). To this end, this module in this case controls the electric power P supplied to the lighting device 11.

The lighting control module 131 is programmed more specifically to control the power of the emitted infrared radiation on the basis of an ambient brightness in the infrared region.

The ambient brightness in the infrared region is defined here in a manner comparable to the ambient brightness in the visible region as presented above, but for the infrared region. The control of the power of the emitted infrared radiation is comparable to the control of the abovementioned exposure parameters, but it is carried out on the basis of the ambient brightness in the infrared region, rather than being carried out on the basis of the ambient brightness in the visible region.

The lighting control module 131 is programmed to control the power of the infrared radiation emitted in steps a) and b), shown in FIG. 6 and described below.

In step a), the lighting control module 131 determines the ambient brightness in the infrared region.

The ambient brightness in the infrared region is representative of the power of infrared electromagnetic radiation (the components of which mainly extend beyond 700 nanometers), coming from the environment of the image-capturing device 1, here coming from the field of view 14 of this device, and received by a brightness sensor. In the embodiment described here, this brightness sensor is formed by way of the image sensor 9.

As a variant, it could however be a sensor separate from the image sensor, such as an infrared photodiode arranged so as to receive radiation coming from the field of view of the image-capturing device.

In this case, the ambient brightness in the visible region is determined from an infrared image 31, delivered by the preprocessing module 130 at the end of a previous execution of step c), and therefore corresponding t n image acquisition performed beforehand by the image sensor 9.

In this case, the lighting control module 131 is programmed to determine the ambient brightness in the infrared region on the basis of the brightness values of at least some of the image pixels 33 of this infrared image 31 acquired beforehand by the image-capturing device 1.

The ambient brightness in the infrared region may, such as here, be determined by calculating an average of the brightness values of the image pixels 33 of this infrared image 31. The ambient brightness in the infrared region is then representative of an average brightness level in this infrared image 31, hereinafter called first brightness level and denoted $L_{IR}$.

The average in question may relate to all of the image pixels 33 of the infrared image 31, or relate to only some of these image pixels 33, located in an area of interest of the image, corresponding for example to the image of the face of the driver 3. Provision may also be made for this average to take into account only the brightness values of the image pixels 33 that meet a given criterion, for example that are contained within a given interval of values. The first brightness level $L_{IR}$ may thus, by way of example, be representative of the average brightness of the low-brightness areas of the infrared image 31, or of the intermediate-brightness areas of this image.

In step b), the lighting control module 131 controls the electric power $P_E$ supplied to the lighting device 11 on the basis of the ambient brightness in the infrared region as determined in previous step a).

To this end, the lighting control module 131 in this case corrects the value of the electric power $P_E$ on the basis of a difference ε1 between:
- an average brightness target value in the infrared region, hereinafter called first target value on the one hand, and
- the first brightness level $L_{IR}$ (average brightness in the infrared image 31 acquired beforehand), on the other hand.

This correction is made so as to gradually bring the first brightness level $L_{IR}$ to the first target value $L_{IR,O}$ during repetitions of steps a), b) and c). This correction may consist for example in adding a corrective term to a previous value of the electric power $P_E$, this corrective term being proportional to the abovementioned difference ε1 (proportional correction). More generally, this correction consists in slaving the first brightness level $L_{IR}$ to the first target value $L_{IR,O}$. This slaving may in particular be of proportional, proportional-integral, or proportional, integral and derivative type (that is to say of "PID" type).

The first target value $L_{IR,O}$ corresponds for example to the average brightness in an image considered to be suitably exposed (one example of the definition of an image considered to be suitably exposed was given above).

The first target value $L_{IR,O}$ may for example be between one quarter and three quarters of the maximum brightness value able to be associated with an image pixel 33 of the infrared image 31, or be between one third and two thirds of this maximum value. By way of example, if the brightness values of the image pixels 33 are coded on eight bits, and are between 0 and 255, the abovementioned maximum brightness value (high saturation) is equal to 255, and the first target value 6.0 may then be between 63 and 191, for example, or between 85 and 170.

Monitoring System for Monitoring the Driver

The electronic processing unit 20 of the monitoring system 2 is programmed to determine the level of the driver's 3 inability to drive $I_L$ based on at least one of the infrared images 31 produced by the image-capturing device 1. The level of inability to drive $I_L$ comprises for example a drowsiness level of the driver 3 and/or a distraction level of the driver 3 (the level of inability to drive $I_L$ may in particular be a drowsiness level of the driver 3 or a distraction level of said driver).

The processing unit 20 may for example be programmed so as to analyze the infrared image 31 in question, or a sequence of infrared images 31 produced by the image-capturing device 1, in order to identify the face of the driver 3 and/or certain areas of the face of the driver 3, in particular the areas of the infrared image 31 corresponding to the eyes of the driver 3. The processing unit 20 may then determine the level of drowsiness of the driver 3 by measuring the duration and/or the frequency of the blinking of the eyes of the driver 3, identified beforehand in the infrared image 31.

The processing unit 20 may determine the distraction level of the driver 3 on the basis of a posture of the head of the driver 3 deduced from the infrared image 31, and on the basis of the evolution of this posture over time.

The processing unit 20 may also evaluate the gaze direction of the driver 3 or the evolution of this gaze direction over time (by analyzing the infrared image 31 or a sequence of infrared images 31) and use same to determine the distraction level and/or the drowsiness level.

The processing unit 20 may also evaluate the diameter of the pupil of at least one eye of the driver 3 (and precisely the variations in this diameter) (by analyzing the infrared image 31 or a sequence of infrared images 31) and use same to determine the distraction level and/or the drowsiness level.

The processing unit 20 may be programmed, when determining the level of the driver's inability to drive $I_L$, to also take into account one or more color images 35 delivered by the image-capturing device 1.

The color image 35 may be used in other applications.

The computer 13 may for example transmit the color image 35, or a sequence of color images 35, to a telecommunications module 43 of the vehicle 5. This telecommunications module 43 is configured so as to transmit the color image 35, or the received sequence of color images 35, to a remote electronic device, for example a multifunction mobile or a computer, for example via a Wi-Fi transmitter. The color image 35 or the sequence of color images 35 may then be used within the framework of a teleconference, for example a videoconference.

The computer 13 could also transmit the color image 35, or the sequence of color images 35, to a memory of the vehicle 5 for it to be stored therein.

Various variants may be made to the image-capturing device or to the system for monitoring the driver that have been described above.

For example, the second image, formed from the electrical signals generated by the second photosensitive pixels of the image sensor, could be a monochrome image rather than being a color image. The second filter elements of the array of optical filters could also all be of the same type (for example all be green filter elements) rather than comprising three different types of optical filters (respectively red, green and blue).

On the other hand, the various functionalities of the computer could be distributed differently between modules. A larger number of modules could be used, or, on the contrary, one and the same module could execute all of the operations, executed by the computer, that have been described above. It should be noted that the term module may denote an electronic circuit, or a portion of an electronic circuit separate from the other modules, or a specific group of instructions stored in the memory of the computer.

Moreover, the abovementioned first and second images could correspond to raw images, as it were, obtained without interpolation. In this case, the number of image pixels of the infrared image, for example, would be equal to the number of said first photosensitive pixels rather than being equal to the total number of photosensitive pixels of the image sensor.

The invention claimed is:

1. An image-capturing device comprising:
   an image sensor comprising:
      an array of optical filters receiving electromagnetic radiation and comprising first filter elements each able to transmit a first portion of the electromagnetic radiation contained in a given infrared wavelength range, and second filter elements each able to transmit at least one component of a second portion of the electromagnetic radiation located in a visible wavelength range, and
      a matrix of photosensitive pixels comprising first photosensitive pixels arranged so as to capture the first portion of the electromagnetic radiation transmitted by the first filter elements, and second photosensitive pixels arranged so as to capture the component transmitted by the second filter elements, each of the first photosensitive pixels and the second photosensitive pixels being able to generate an electrical signal representative of a power of the electromagnetic radiation that it captures;
   a lighting device configured so as to emit infrared radiation in a field of view of the image-capturing device, the infrared radiation being located at least partially in the range of wavelengths transmitted by the first filter elements; and
   a computer configured to:
      determine an ambient brightness in the infrared wavelength range and an ambient brightness in the visible wavelength range,
      control the power of the infrared radiation emitted by the lighting device based upon the ambient brightness in the infrared wavelength range,
      acquire the electrical signals generated by the first photosensitive pixels and the second photosensitive pixels, form a first image from the electrical signals generated by the first photosensitive pixels, and form a second image from the electrical signals generated by the second photosensitive pixels,
      wherein the ambient brightness in the visible wavelength range is determined based upon brightness values of at least some of the image pixels of the second image such that the ambient brightness in the visible wavelength range represents a second average brightness level in the second image;
      control at least one exposure parameter of a plurality of exposure parameters based upon the ambient brightness in the visible wavelength range, the plurality of exposure parameters comprising:
         an integration time, each of the electrical signals being representative of an electric charge or voltage, accumulated by a corresponding photosensitive pixel over the integration time,
         a gain applied to the electrical signals,
         an aperture of a diaphragm of an optical system of the image-capturing device, and
      correct at least one of the exposure parameters based upon a difference between a second average brightness target value, and the second average brightness level in the second image,
      wherein correcting the exposure parameters comprises adding a corrective term, proportional to the difference between the second average brightness target value and the second average brightness level, to at least one of the exposure parameters.

2. The image-capturing device as claimed in claim 1, wherein the computer is configured, after acquiring the electrical signals and forming the first image and the second image, to determine the ambient brightness in the infrared wavelength range, based upon brightness values of at least some of the image pixels of the first image.

3. The image-capturing device as claimed in claim 2, wherein the computer is configured to determine the ambient brightness in the infrared wavelength range such that it is representative of a first average brightness level in the first image.

4. The image-capturing device as claimed in claim 3, wherein the computer is configured to control the power of the infrared radiation emitted by the lighting device based upon a difference between a first average brightness target value and the first average brightness level in the first image.

5. The image-capturing device as claimed in claim 1, wherein the wavelength range transmitted by the first filter elements is between 700 nanometers and 1100 nanometers.

6. The image-capturing device as claimed in claim 1, wherein the second filter elements comprise red filter elements having a red bandwidth transmitting wavelengths at least between 550 nanometers and 700 nanometers, green filter elements having a green bandwidth transmitting wavelengths at least between 450 nanometers and 650 nanometers and blue filter elements having a blue bandwidth transmitting wavelengths between 400 nanometers and 550 nanometers.

7. A monitoring system for monitoring a driver of a vehicle, comprising:
   the image-capturing device as claimed in claim 1; and
   a processing unit programmed to determine a level of inability of the driver to drive based at least on the first image.

8. The monitoring system as claimed in claim 7, wherein the level of inability to drive comprises a drowsiness level or a distraction level of the driver.

* * * * *